though the teachings of this invention.

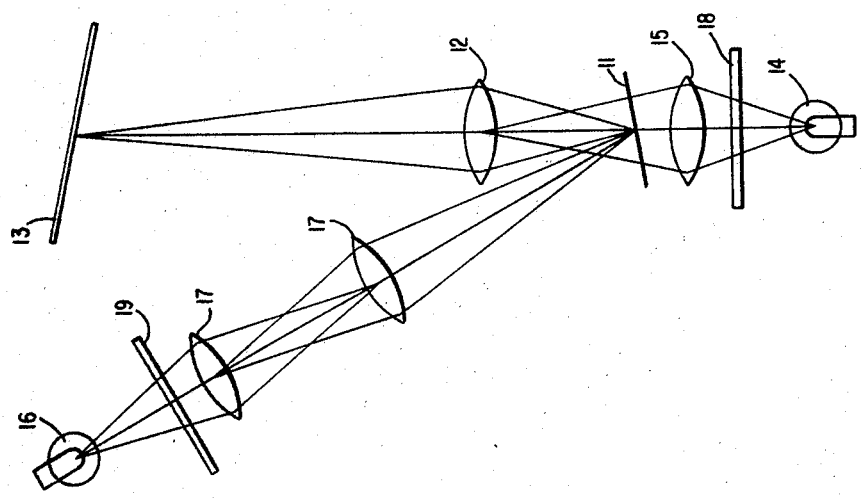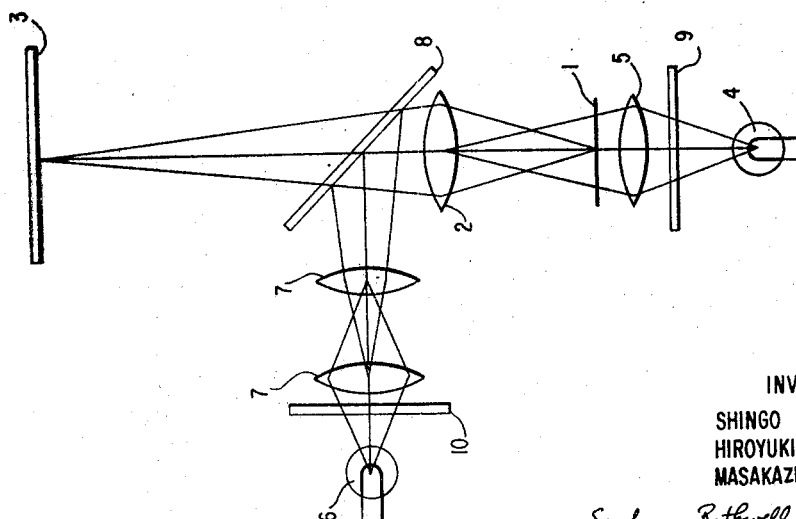

United States Patent Office 3,475,096
Patented Oct. 28, 1969

3,475,096
METHOD AND APPARATUS FOR CONTROLLING THE CONTRAST OF AN IMAGE INCLUDING A PROCESS FOR REVERSAL OF THE IMAGE
Shingo Ooue, Hiroyuki Ueda, and Masakazu Hashiue, Kita-Adachigun, Saitama, Japan, assignors to Fuji Shashin Film Kabushiki Kaisha, Kanagawa, Japan
Filed Aug. 19, 1966, Ser. No. 573,522
Claims priority, application Japan, Aug. 20, 1965, 40/50,684
Int. Cl. G03b 27/54, 27/70
U.S. Cl. 355—70                     8 Claims

ABSTRACT OF THE DISCLOSURE

Method of optically controlling the contrast of a projected image which comprises transmitting light through a picture which is characterized by high reflectance in areas of high transmission density to project a transmitted image and reflecting light from the picture to project a reflective image. The transmitted and reflected images are combined into a single projected image and the ratio of the transmitted light to the reflected light is controlled to thereby adjust the contrast of the resultant single projected image.

Figure 3:
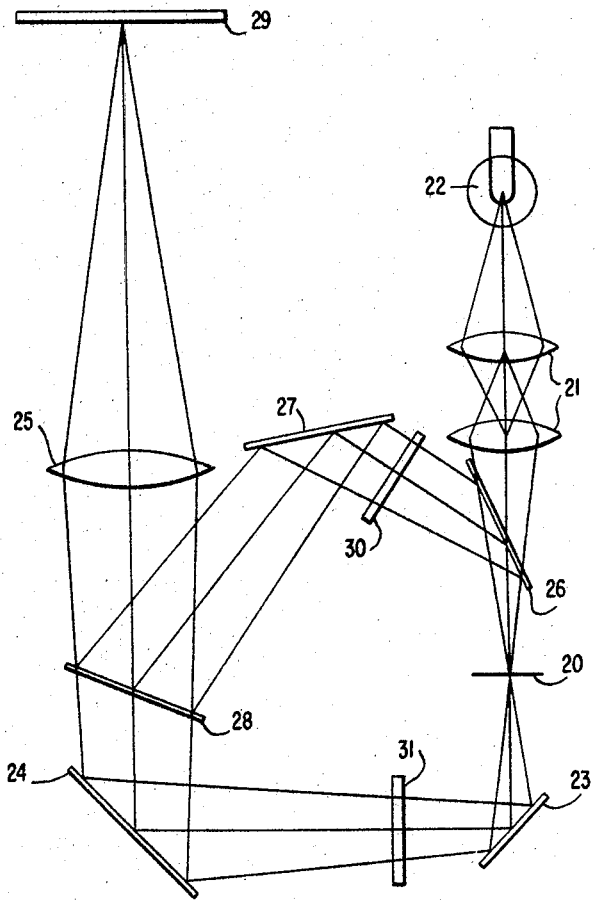

Apparatus for controlling the contrast of a projected image comprises a light source and a condenser lens system for transmitting light to a picture characterized by high reflectance in areas of high transmission density to project a transmitted image of the picture, and a light system for reflecting light from the picture to project a reflected image of the picture, the reflection system in some embodiments utilizing half-silvered mirrors, a projection lens system to combine the transmitted and the reflected images into a composite projected image of the picture, and a system to control the ratio of the transmitted light to the reflected light, such as light modulators and the like, whereby the contrast of the composite projected image is controlled.

---

The present invention relates to a method and apparatus for optically controlling the contrast of a projected image over a range which may include complete image reversal if desired.

When printing a developed photographic film image on a photographic printing paper or on a cinematographic positive film, or when making a duplicating negative film from a positive film, or when projecting a slide film or a movie film, it is frequently desired to control the contrast of a picture in order to obtain a photographic product having desired tonal qualities or a particular density range. In a development process, for example, it has generally been noted that a picture of excessively high contrast is produced if the development time is too long and a picture of excessively low contrast results if the development time is too short. In an automatic printing apparatus using a rolled paper, furthermore, it is generally impossible to change from a photographic printing paper of one contrast to a photographic printing paper of another contrast while in operation, in order to thereby alter the contrast of the resulting product. The provision of a variable contrast printer which is of simple construction and which could produce a picture of high brightness would therefore result in a number of advantages in the photographic printing art. With such a printer the image quality of a picture could be improved to a great extent if the contrast of an image could be unrestrainably varied by the optical system of the printer.

Previous devices for varying the contrast of an image have included an enlarger of a contrast variation type using a flying spot scanner, a printer and an inversion viewer coupled with a television system, and a printer and an inversion viewer utilizing the quenching phenomenon exhibited by fluorescent materials. These devices, however, have disadvantages in that they cannot be successfully used with pictures having low sharpness, and furthermore they are complex in their construction and relatively expensive.

It is therefore an object of this invention to provide a method and apparatus for optically varying the contrast of an image with or without a complete reversal of the image, by utilizing both transmitted light and reflected light to form an image from a photographic film having a high reflectance at areas having a high transmission density.

It is therefore an object of this invention to provide such an apparatus which can be manufactured easily due to its simple construction and which can produce an image enriched in brightness.

It is a further object of this invention to provide such a method and apparatus for varying the contrast of an image over a wide range and for effecting complete reversal of the image if desired, which enables a person to observe with naked eyes a positive image produced by the projection of a negative image and having controlled contrast. Furthermore, the apparatus of this invention may also be used as an inversion viewer or a slide or movie projector.

This invention requires the use of a photographic film carrying the image to be projected or copied which is characterized by a high reflectance at areas having a high transmission density after processing, such as film produced by the vacuum evaporation of silver halide onto a substrate or silver alginate photographic film. A conventional photosensitive material containing a gelatine binder forms an image which reflects only a small amount of light, which is unsuitable for use with this invention since too narrow a range of contrast variation could be realized. We have found that with vacuum evaporated photographic films and silver alginated photographic films, which produce images having a metallic appearance, a negative image results from transmitted illumination while a positive image is produced by reflected illumination. Moreover, we have found that the contrast of an image may be controlled, or reversal of an image and adjustment of its contrast after reversal may be attained, by simultaneously combining the images formed from both transmitted illumination and reflected illumination and by controlling the amount of the former in relation to that of the latter.

Figure 4:
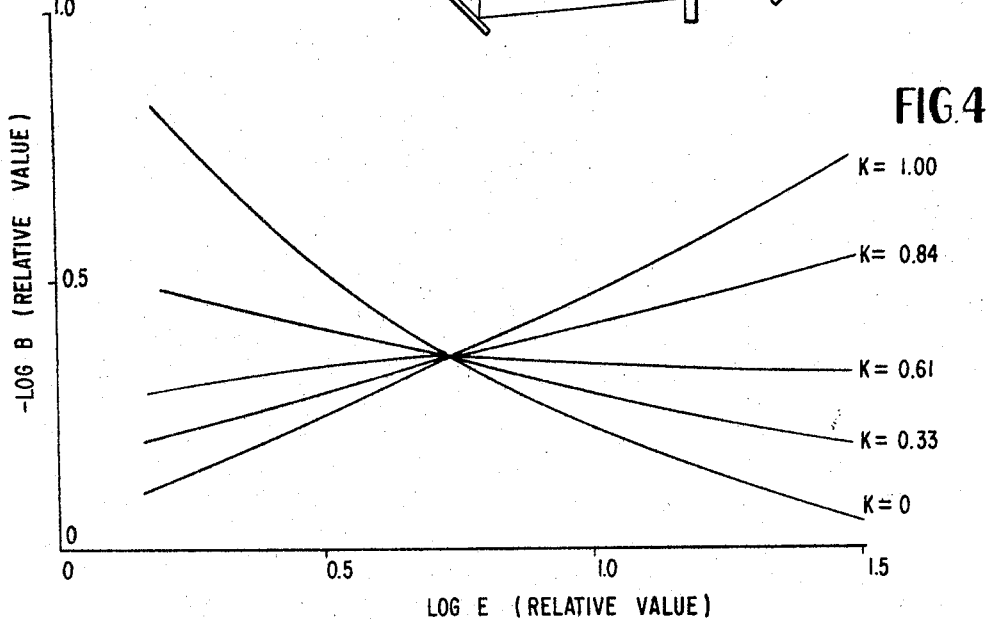

The invention will now be more closely described with reference to the accompanying drawings, in which:

FIGURES 1, 2 and 3 show optical systems constructed in accordance with the teachings of this invention, and FIGURE 4 is a graph showing the range of an image contrast before or after reversal which may be achieved through the teachings of this invention.

FIGURE 1 shows a variable contrast optical system in which an image 1 is projected on a photographic printing material or a screen 3 through a projection lens 2, the image being projected by transmitted light having its origin in light source 4 in combination with a condenser lens 5. The image 1 is simultaneously projected by reflected light originating in light source 6 and passing through a condenser lens system 7 onto a half silvered mirror 8 (or a member capable of partly reflecting and partly transmitting light) which is interposed between the source 4 or the source 6 and the screen 3. Each illumination system is preferably provided with either light modulators 9 and 10 or other suitable means for controlling the intensity of a light source, thereby enabling the control of the ratio of illumination levels between the transmitted light and the reflected light. The light modulators may comprise sets of movable optical wedges or two sheets of polarizers whose transmission index may be controlled by rotation. When employing a device for controlling the intensity of a light source as a light modulator, such as a device for controlling the voltage at which an incandescent lamp is operated, the optical system may be provided with a light balancing filter for the compensation of color balance, if required, because the color of the transmitted light is different from the color of the reflected light.

FIGURE 2 shows an optical system which differs from that shown in FIGURE 1 in that it provides reflected light without the use of a half silvered mirror. When a picture or image 11 is illuminated by a transmission source 14 and condenser lens 15, and by a reflection source 16 and condenser lenses 17, and is projected by lens 12 onto a photographic printing material or a screen 13, while the intensities of the illuminations are controlled by light modulators 18 and 19, an image is formed whose contrast may be varied over a wide range either with or without an image reversal. The optical system of this arrangement makes possible the formation of a brighter image as compared with the optical system shown in FIGURE 1, but suffers from the disadvantage that some minor image distortion is produced owing to the angles of incidence involved being other than 90 degrees.

In the optical system shown in FIGURE 3, only one illumination light source 22 and only one condenser lens system 21 are employed. The light transmitted through an image 20 is directed by mirrors 23 and 24 to a projection lens 25. On the other hand, the light reflected from the image 20 is led to the projection lens 25 through half silvered mirrors 26 and 28 and a full mirror 27. A composite light resulting from both the transmitted and reflected lights at a position immediately before the lens 25 is finally projected onto a photographic printing material or screen 29. The mechanism for controlling the intensities of the transmitted light may be of any suitable type, such as the light modulators 30 and 31.

The following description is intended to explain how the contrast of an image formed by projecting the composite light resulting from both the transmitted light and the reflected light is varied.

It can readily be shown that the brightness B of a picture is related to the illumination of the transmitted light $E_T$ on a picture plane and the illumination of the reflected light $E_R$ on the picture plane, through the following equation:

$$B = C(E_T T + E_R R)$$

where T and R are the transmittance and the reflectance of the picture against the incident light, respectively, and C is a constant depending on the $f$ number of the projection lens and other parameters of the optical system. When $E_R$ is equal to zero and only the transmitted light is used for projection, B is proportional to T and a negative image may be formed if a negative picture is subjected to a conventional development process. In a case where $E_T$ is equal to zero and only the reflected light is used for projection, B is equal to R and a positive or reversed image is produced if a negative picture is developed by a conventional process. By selecting a suitable ratio for $E_R$ to $E_T$ an image may be produced ranging from negative to positive and having a desired degree of contrast. If gamma is a numeral representing the contrast, variation of gamma with respect to K (K being equal to $E_T/(E_R+E_T)$) is shown in the table below, wherein a plus sign represents the gamma of negative characteristics and a minus sign the gamma of positive characteristics, the numerals in the table having been obtained experimentally.

TABLE 1

| K: | Gamma |
|---|---|
| 0 | −0.5 |
| 0.33 | −0.25 |
| 0.61 | 0 |
| 0.84 | 0.25 |
| 1.00 | 0.5 |

As shown in FIGURE 4, characteristic curves of the optical systems are obtained by taking K as a parameter. By controlling both $E_R$ and $E_T$ as well as K while maintaining the term of $E_R+E_T$ approximately constant, the optical systems become suitable for use in a printer or a projector, because the brightness of a projected image does not vary to a great extent.

It may thus be seen that the advantages afforded by this invention include the following:

(1) From a number of picture negatives having a wide range of contrasts positive pictures may be produced having a desired tone quality on a printing paper or positive film having a fixed degree of contrast, (2) Since a negative picture can be observed in the form of a positive picture with the naked eye after reversal thereof, the optical systems of this invention can also be used as inversion viewers, and the contrast of an image resulting from reversal can also be controlled, and (3) Since the contrast of a particular portion of an image can be controlled by directing either transmission illumination or reflection illumination onto only a particular portion of a picture, a positive picture may be produced having a uniform contrast from an original picture having a number of degrees of object contrast within it.

The optical systems in accordance with this invention are suitable for use in a photographic enlarger or printer, a cinematographic optical printer and an inversion viewer.

What is claimed is:

1. A method of optically controlling the contrast of a projected image over a range including complete image reversal, comprising:
    (a) transmitting light through a picture formed on a photographic material characerized by high reflectance in areas of high transmission density to project a transmitted image,
    (b) reflecting light from the picture to project a reflected image,
    (c) combining the transmitted and reflected images into a single projected image, and
    (d) controlling the ratio of the transmitted light to the reflected light to thereby control the contrast of the single projected image.

2. An apparatus for optically controlling the contrast of a projected image over a range including complete image reversal, comprising:
    (a) means for transmitting light through a picture formed on a pohtographic material characterized by high reflectance in areas of high transmission density to project a transmitted image of the picture,
    (b) means for reflecting light from the picture to project a reflected image of the picture,
    (c) optical means for combining the transmitted and reflected images into a composite, projected image of the picture, and
    (d) means for controlling the ratio of the transmitted light to the reflected light to thereby control the contrast of the composite projected image of the picture.

3. An apparatus as defined in claim 2 wherein:
    (a) the means for transmitting light includes a first light source and a condenser lens system therefor, and
    (b) the means for reflecting light includes a second light source and condenser lens system therefor and a half silvered mirror positioned to reflect light from the second source against the picture while transmitting light from the first and second sources that has already been transmitted through and reflected from the picture, respectively, to an image plane.

4. An apparatus as defined in claim 3 wherein the means for controlling comprises a pair of light modulators separately disposed in the paths of the transmitted light and the reflected light.

5. An apparatus as defined in claim 2 wherein:
 (a) the means for transmitting light includes a first light source and a condenser lens system therefor,
 (b) the means for reflecting light includes a second light source and a condenser lens system therefor, and
 (c) the light from the first and second sources are directly incident on the picture at angles slightly less than 90 degrees.

6. An apparatus as defined in claim 5 wherein the means for controlling comprises a pair of light modulators separately disposed in the paths of the transmitted light and the reflected light.

7. An apparatus as defined in claim 2 wherein the means for transmitting light and means for reflecting light comprises:

(a) a single light source and a condenser lens system therefor, and
 (b) a half silvered mirror positioned to transmit light from the source to the picture while reflecting light that has already been reflected from the picture in a separate path.

8. An apparatus as defined in claim 7 wherein the means for controlling comprises a pair of light modulators separately disposed in the paths of the transmitted light and the reflected light.

References Cited
UNITED STATES PATENTS 2,748,649   6/1956   Orlando.
2,783,678   3/1957   Andreas et al. _____ 88—24

NORTON ANSHER, Primary Examiner

R. A. WINTERCORN, Assistant Examiner

U.S. Cl. X.R.
355—66